(No Model.) 2 Sheets—Sheet 1.

E. CHAFFEY.
CAR BRAKE AND STARTER.

No. 442,700. Patented Dec. 16, 1890.

Witnesses
M. C. Galer
Alfred J. Townsend

Inventor
Elwood Chaffey
by Hazard & Townsend
his attys.

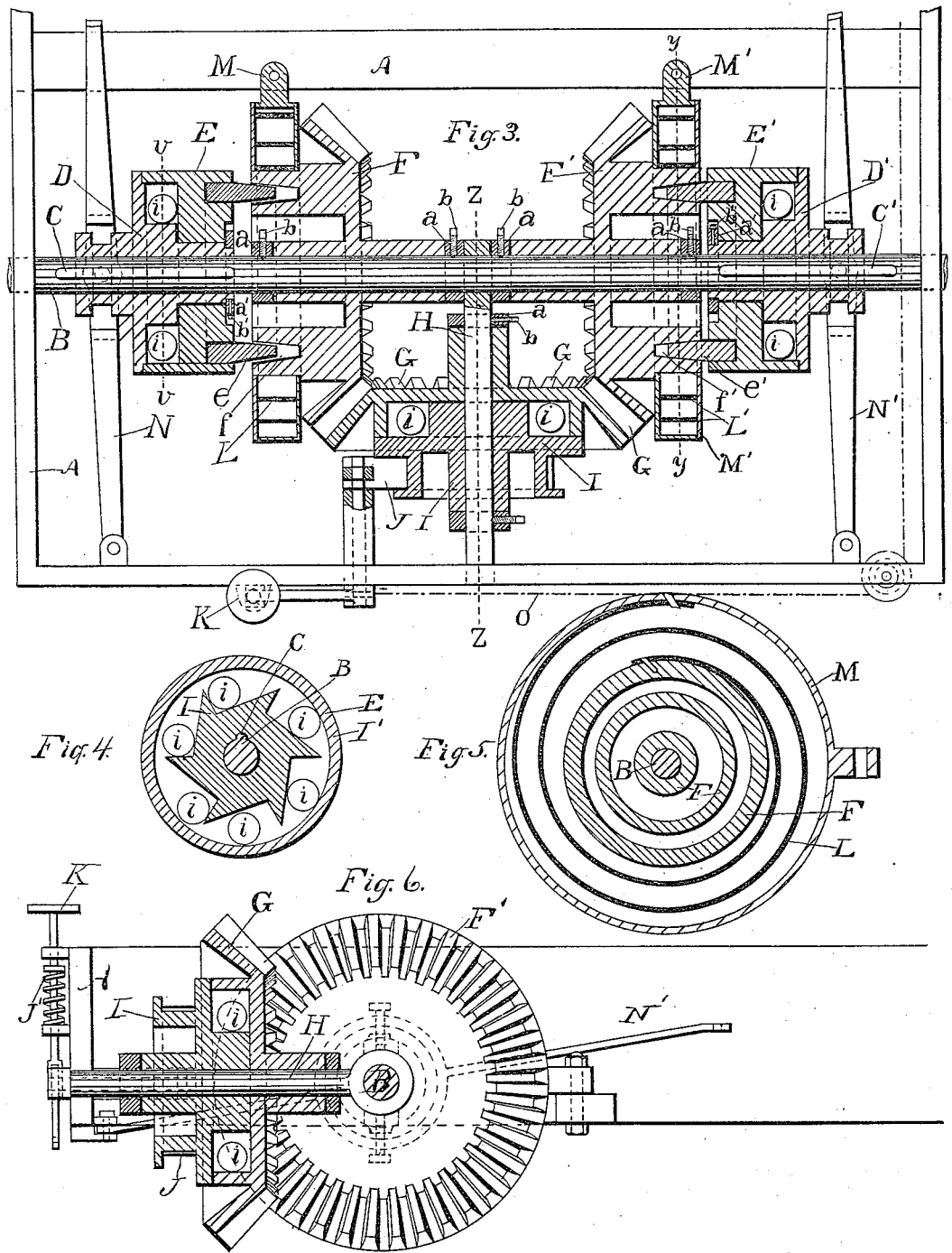

UNITED STATES PATENT OFFICE.

ELSWOOD CHAFFEY, OF SANTA MONICA, ASSIGNOR OF ONE-HALF TO
B. HOMER FAIRCHILD, OF CLAREMONT, CALIFORNIA.

CAR BRAKE AND STARTER.

SPECIFICATION forming part of Letters Patent No. 442,700, dated December 16, 1890.

Application filed May 2, 1890. Serial No. 350,394. (No model.)

*To all whom it may concern:*

Be it known that I, ELSWOOD CHAFFEY, of Santa Monica, in the county of Los Angeles and State of California, have invented a new and useful Car Brake and Starter, of which the following is a specification.

The object of my invention is to provide effective mechanism of few parts whereby the momentum of the car can be stored while the car is being stopped, and then can be applied at pleasure to propel the car in either direction, and which will be noiseless, and which is so arranged as to distribute the strain so as to avoid the liability of breakage.

The accompanying drawings illustrate my invention.

Figure 1:
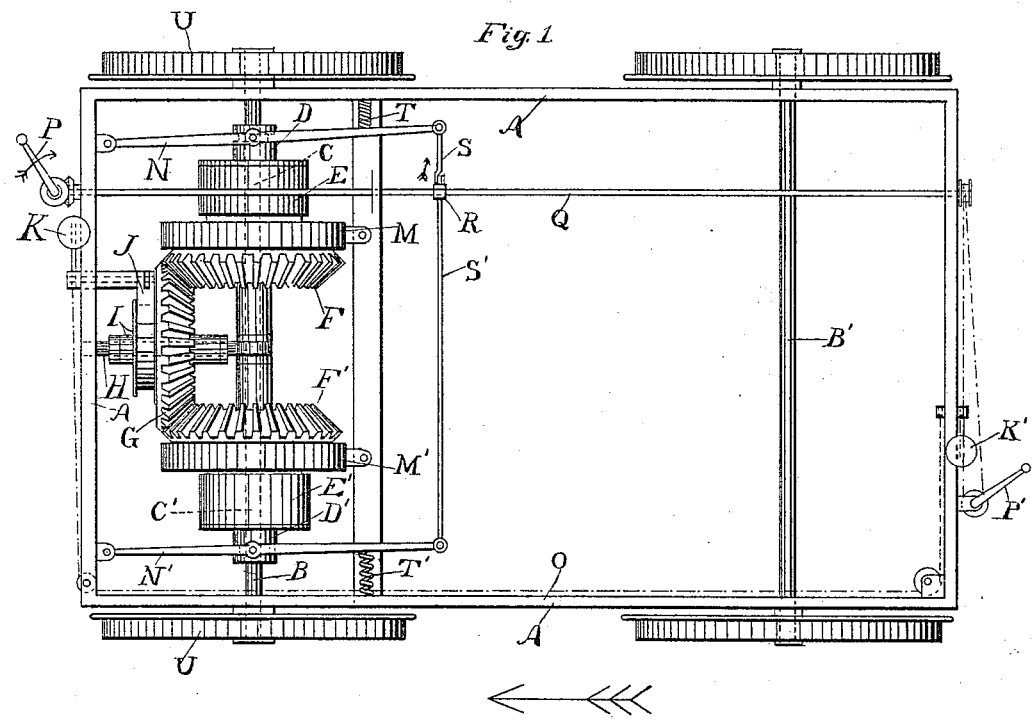
Figure 2:
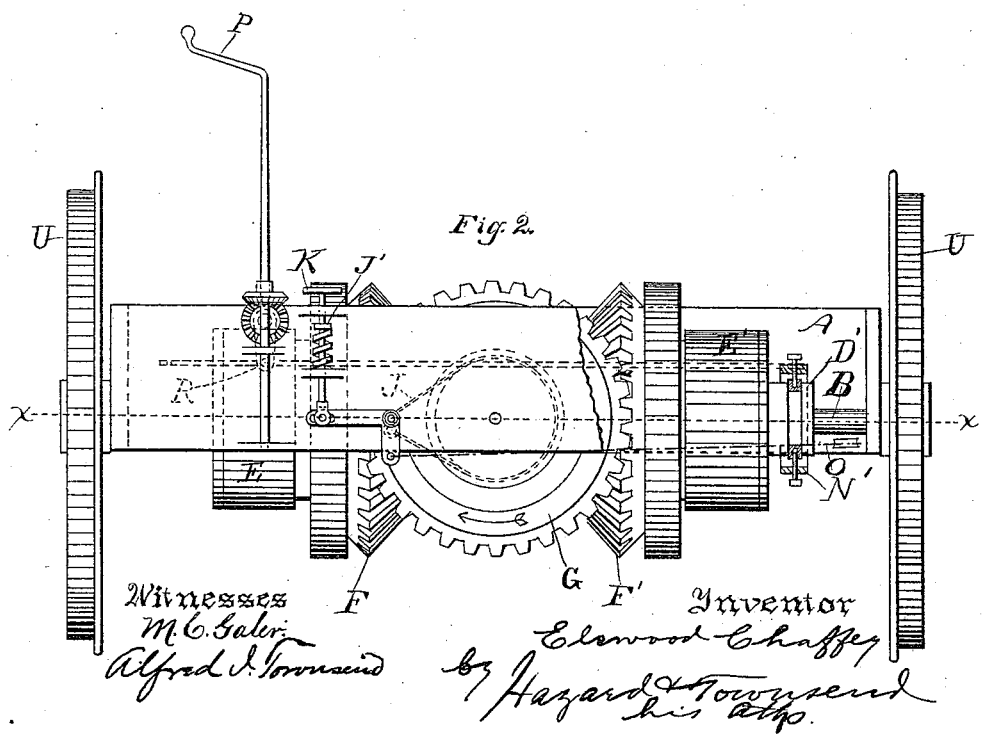

Figure 1 is a plan view of the frame of a car provided with my invention. Fig. 2 is an end view of the same, a portion of the frame being broken away and parts of the mechanism being shown in dotted lines. Fig. 3 is a horizontal mid-section on line $x\ x$, Fig. 2. Fig. 4 is a section of the ratchet-and-ball gear. Line $v\ v$, Fig. 3, shows the line of section. Fig. 5 is a section of the spring-case and drum and clutch on line $y\ y$, Fig. 3. Fig. 6 is a vertical mid-section of the balance-gear on line $z\ z$, Fig. 3.

My invention comprises the combination of the car-frame, the car-axle provided with fixed car-wheels, two power-accumulator-operating miter-wheels loosely mounted upon such axle, a miter-connecting wheel engaging with the beveled faces of the accumulator-operating wheels, two reversely-arranged power-accumulator devices consisting of metallic springs or other suitable elastic material, each fixed to the car-frame and connected, respectively, with the accumulator-operating wheels, two sliding clutches mounted upon the axle and arranged to rotate therewith and adapted to respectively engage with and disengage from the accumulator-operating-wheels, means for operating such clutches, and means for controlling the rotation of the accumulator-operating-wheels.

My invention also embraces other features and combinations hereinafter more fully set forth.

In the drawings, A represents the car-frame, and B B' the car-axles, only one of which B is shown supplied with my invention. It will be understood, however, that both axles may be provided with the device.

C C' are splines on the axle B.

D D' are shifting sleeves loosely mounted upon the axle to slide therealong, but engaging, respectively, with the splines and compelled thereby to rotate with the axle.

E E' are clutches connected, respectively, with the sleeves D D' and arranged to rotate therewith, being secured against lateral movement by collars and set-screws $a'\ b'$. These clutches are preferably connected with the sleeves by means of ratchet mechanism arranged, respectively, reverse to each other, so that the rotation of the axle in one direction compels only one clutch to rotate, while the rotation of the axle in the other direction compels only the other clutch to rotate. The clutches are preferably provided with annular wooden faces $e\ e'$, which are arranged to respectively engage the walls of the annular grooves $f\ f'$ in the bevel-faced power-accumulator-operating wheels F F', which are journaled upon the axle to rotate thereon and are secured by collars and set-screws $a\ b$ against lateral movement therealong.

G is the beveled connecting-wheel engaging with the bevel-faces of the two accumulator-operating wheels. Connecting-wheel G is journaled upon and held in position by a shaft H, one end of which is journaled upon the car-axle B, while the other end is secured to the frame of the car. The connecting-wheel G is preferably connected with a self-sustaining brake J by means of mechanism such as the ratchet I $i$, which allows the rotation of the connection-wheel in one direction, but prevents rotation in the opposite direction when the brake is applied.

K represents a foot-plate connected with the brake-band J for its operation. K' is a foot-plate at the other end of the car for a like purpose.

O is a chain connecting foot-plate K' with the brake-operating mechanism.

J' is a spring which operates to apply the brake J at all times except when the foot-plate is pressed down.

The ratchet mechanism I prefer to use throughout is shown in Fig. 4, and consists of a ratchet-wheel I, an annular case I', and loose balls i. This form of ratchet, however, is well known and is illustrated only for convenience of explanation. Other forms of ratchet may be employed; but this form is preferable, as it is noiseless.

The power-accumulators I prefer to use consist of spiral springs L L', each secured by one end to its respective fixed case M M' and by the other end to its respective operating-wheel F F'. The cases M M' are secured to the car-frame. Fig. 5 shows the spring so connected. It will be understood the springs are arranged the same in each case, and that their reverse operation results from their reverse position upon the axle. The clutch-ratchets are also the same in their arrangement, and their reverse operation results from their reverse position on the axle.

N N' are levers respectively engaging the sleeves D D' to throw the clutch mechanism into and out of gear. These levers are operated by suitable mechanism. In the drawings they are represented as being operated by the ordinary brake-cranks P P', one of which is geared upon a shaft Q, extending from end to end of the car and provided with a crank-arm R, (shown in dotted lines in Fig. 2,) which operates rocker-beams S S', which are pivoted to the ends of the levers N N'.

In practice, when the car is running, the spring J' operates the self-sustaining brake J to hold the ratchet I stationary, so that the connecting-wheel G can rotate only in the direction allowed by the ratchet, as indicated by the arrow in Fig. 2. The clutches D D' being both out of gear, the car runs freely in either direction without operating the brake and starter mechanism.

For convenience, suppose the car to be running in the direction of the long arrow in Fig. 1. To stop the car the brake-handle P is turned in the direction of the curved arrow in Fig. 1. This rotates shaft Q, and the rocker-crank R is thereby swung in the direction of the short arrow in Fig. 1, thus operating the rods S S' and levers N N' to throw clutch E' into gear with the wheel F', which is thereby rotated in the direction in which the car-wheels rotate. The motion of F' is transmitted through gear G to wheel F, which is thereby rotated in a direction reverse to F'. This operation winds both the springs L and L'. The resistance of the springs overcomes the momentum of the car, which is thus finally stopped. The brake-handle may now be released, and the spring T' operates to throw the clutch out of gear. The self-sustaining band-brake prevents the springs from unwinding.

When it is desired to start the car in the same direction as that in which it was going, the brake-handle is turned in the direction reverse to the arrow, thus throwing clutch E into gear. Then by depressing the foot-plate K the band-brake J is released, thereby allowing the springs to rotate wheels G, F, and F' and the clutch E and the axle to drive the car-wheels U in the desired direction. By this mechanism the power of both springs is applied to stop and start the car.

When the springs are wound, they may be applied to run the car in either direction, depending upon which clutch is thrown into gear. The means whereby the clutches are compelled to rotate with the axle, each in a direction reverse to the other, and are allowed to slip, respectively, in the reverse directions— that is to say, the ball-and-ratchet gears of the clutches or equivalent mechanism—are not absolutely necessary to the operation of the device, if sufficient care is taken to free the clutches when the car has been started; but by the use of such mechanism it becomes immaterial whether the clutches are then freed or not, for the rotation of the car-wheels cannot operate to unwind the springs. Furthermore, by the employment of the ratchet mechanism of the clutches it becomes possible to dispense with the self-sustaining brake J, for the reason that by disconnecting the levers N N' from each other and operating them separately the same results in stopping and starting may be obtained, but the power of the springs cannot be stored except while the car is standing—that is to say, in stopping the car both clutches may be thrown into gear. When the car stops, the clutches operate against each other to prevent the unwinding of the springs. Then to start the car one of the clutches is thrown out of gear and the springs operate upon the other clutch to drive the wheels and start the car. The direction in which the car is driven depends upon which clutch is left in gear.

It will be understood that I do not confine myself to the specific forms of mechanism shown, as other forms of mechanism will readily present themselves to mechanics.

Now, having described my invention, what I claim as new, and desire to secure by Letters Patent, is—

1. The combination of the car-frame, the car-axle provided with fixed car-wheels, two power-accumulator-operating wheels loosely mounted upon such axle, the connecting-wheel engaging with the accumulator-operating wheels, two reversely-arranged power-accumulator devices, each fixed to the car-frame and connected, respectively, with the accumulator-operating wheels, two sliding clutches mounted upon the axle and arranged to rotate therewith and adapted to respectively engage with and disengage from the accumulator-operating wheels, means for operating such clutches, and means for controlling the rotation of the accumulator-operating wheels.

2. The combination of the car-frame, the car-axle provided with fixed car-wheels, two power-accumulator-operating wheels loosely mounted upon such axle, the connecting-wheel engaging with the accumulator-operating wheels, two reversely-arranged power-accumulator devices, each fixed to the car-frame and connected, respectively, with the accumulator-operating wheels, and two sliding clutches mounted upon the axle and provided, respectively, with means whereby the clutches are compelled to rotate with the axle, each in a direction reverse to the other, and are allowed to slip, respectively, in the reverse directions.

ELSWOOD CHAFFEY.

Witnesses:
JAMES R. TOWNSEND,
ALFRED I. TOWNSEND.